July 26, 1938. L. S. WOOD Re. 20,812

DUMPING BODY HOIST

Original Filed Jan. 2, 1935 2 Sheets-Sheet 1

Inventor
Louis S. Wood
By Livernace & Van Antwerp
Attorneys

July 26, 1938. L. S. WOOD Re. 20,812

DUMPING BODY HOIST

Original Filed Jan. 2, 1935 2 Sheets-Sheet 2

Inventor
Louis S. Wood
By Livernance and Van Antwerp
Attorneys

Reissued July 26, 1938

Re. 20,812

UNITED STATES PATENT OFFICE 20,812

DUMPING BODY HOIST

Louis S. Wood, Grosse Pointe Farms, Mich., assignor to Gar Wood Industries, Incorporated, Detroit, Mich., a corporation of Michigan Original No. 2,034,544, dated March 17, 1936, Serial No. 118, January 2, 1935. Application for reissue December 20, 1937, Serial No. 180,844

10 Claims. (Cl. 298—22)

This invention relates to hydraulic hoist dumping of tiltably mounted bodies, which are mounted upon truck chassis and are tilted rearwardly so that the contents of the body may be discharged by gravity.

In the present invention the construction which I have devised is designed primarily for the lifting and tilting of bodies which carry very heavy loads, in practice amounting to thirty or more tons. It is a primary object and purpose of the present invention to provide hydraulic hoisting mechanism which is practical and serviceable to take care of such heavy loads.

It is a further object of the invention to provide hoisting mechanism, including a plurality of hydraulic hoists mounted in spaced apart relation to each other transversely of the chassis frame and which are operable through the pumping of oil thereinto from a single pump, a novel and very practical and useful construction being devised.

A still further object is to provide a construction wherein the hoists are spaced apart a greater distance than the width of the chassis frame, and with the hydraulic hoists located outside of the chassis frame members whereby the lifting of the heavily loaded body is uniform and side twist or sway of the body when it is being lifted with its heavy load therein is substantially eliminated, with an elimination of undue or destructive strains upon the hinges connecting the body of the chassis, and upon other parts of the truck structure.

Another advantage of the present invention is the safety feature which includes a check valve in the high pressure line to the hoisting mechanism, which in case the high pressure line breaks during the tilting movement or at the fully tilted position, prevents the body from dropping to horizontal position. This safety feature is quite essential in that one portion of the high pressure line is necessarily flexible which makes this part of the line more or less fragile.

Many other objects and purposes together with novel mechanisms, constructions and arrangements of parts for attaining the same will appear as an understanding of the invention is had from the following description taken in connection with the accompanying drawings, in which.

Like reference characters refer to like parts in the different figures of the drawings.

The hoist is designed to be mounted on a truck having spaced apart parallel chassis side frame members 1 upon which the body 2 for carrying the load is tiltably mounted on suitable brackets 3 located at the rear of the chassis frame members 1.

Figure 3:
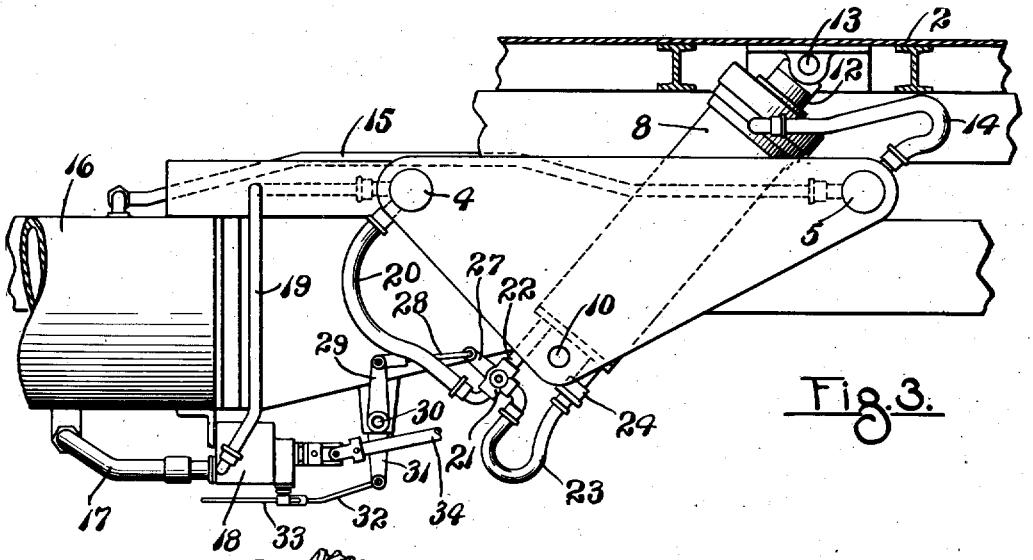
Fig. 3 is a fragmentary enlarged elevation, similar to Fig. 1, showing the assembly and mounting of the hoist with the chassis frame and body.

In the construction of the hoisting mechanism two spaced apart parallel heavy tubes 4 and 5 are located on and above and transversely of the chassis frame members 1, being secured thereto by suitable connecting brackets 6 and at each end extending a distance beyond the frame members 1. A pair of spaced apart triangularly shaped plates 7 are carried on and between the tubes 4 and 5 at each outer side of the frame members 1. The plates 7 have horizontal upper edges and downwardly and inwardly inclined lower edges (Fig. 3) and the tubes 4 and 5 pass through the plates adjacent the upper corners of the triangles. Both of the tubes 4 and 5 are closed at each end.

Figure 5:
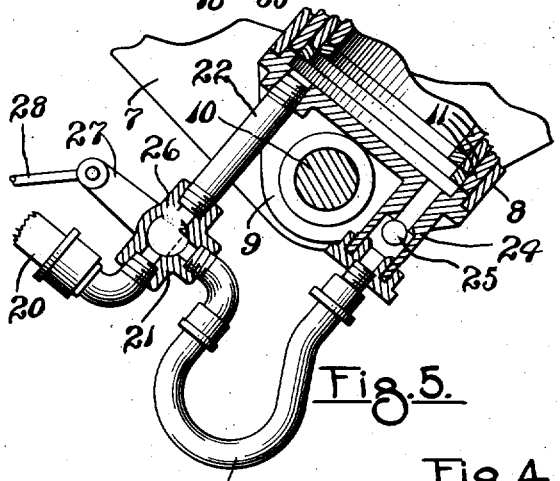
Figure 4:
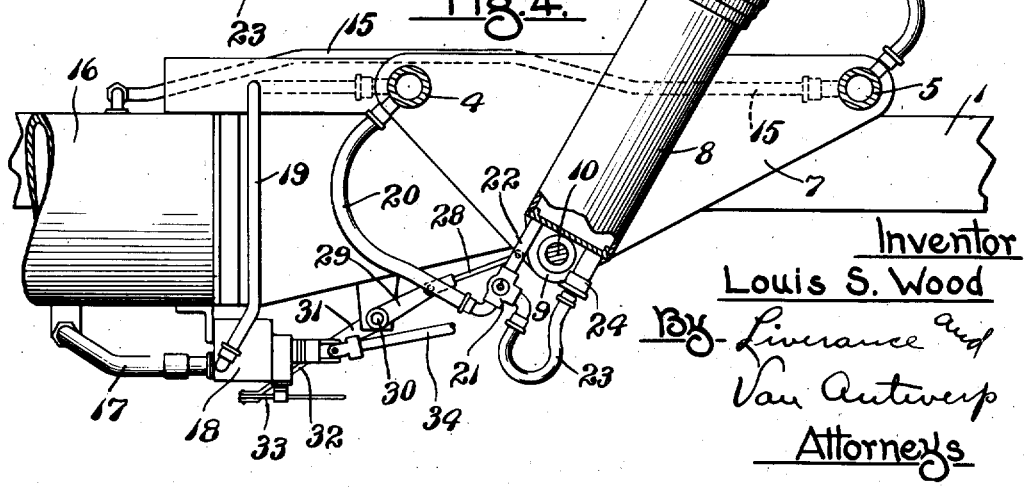
Fig. 4 is a partial side elevation and vertical section of the hoist construction, the section being taken substantially on the plane of line 4—4 of Fig. 2; and, Fig. 5 is a fragmentary enlarged central vertical section at the lower end of one of the telescoping hoist units and showing the valve control therefor.

An extensible hoist is located between the plates of each pair of plates 7. The hoist includes an outer cylinder 8 having downwardly projecting ears 9 at its lower end through which a pivot pin 10 passes, being carried at its ends by the plates 7 at the lower corners thereof. Each hydraulic hoist is of the multiple cylinder telescopic type, with a plurality of telescoping cylinders 11 within the outer cylinder 8 and within each other, as shown in Fig. 5. The innermost cylinder 12 has its upper end pivotally connected at 13 to the underside of the body 2. The two cylinders 12 of the two telescopic hoists at their upper ends are connected to the lower sides of the body 2 at widely spaced apart points and at distances from each other greater than the width of the chassis frame as is evident.

The multiple telescopic hoist construction is of the character shown in my application for patent, Serial No. 367,188, filed May 31st, 1929, and also shown in my Canadian Patent No. 320,-

908, issued March 22nd, 1932, wherein oil pumped into the lower end of the hoist serves to extend the cylinders until a predetermined extension thereof has been had, whereupon with continued operation of the oil pump, the excess oil flows from the hoist back to an oil reservoir. In the construction shown the return pipes or conduits for the oil are shown at 14, one connected at one end near the upper end of each outer cylinder 8, and both of the pipes 14, which are of a flexible character, being connected at their other ends to the tube 5. A return pipe 15 leads from the tube 5 to an oil reservoir tank 16, whereby after the body has been tilted to its extreme position, continued operation of the oil pump causes a return excess of oil from both hoists to the tube 5 and thence back to the reservoir 16.

An outlet pipe 17 from the oil reservoir 16 is connected with a suitable gear pump 18 at the suction side of the pump. Upon operation of the pump the oil is forced outwardly at the pressure side of the pump through a pipe 19 to the tube 4. Flexible conduits 20, one for each hoist unit, are connected each at one end to the tube 4 and at their opposite ends to valve housings 21, one located underneath each telescopic hoist. A pipe 22 leads from the end of each valve housing 21 opposite the point of connection of the flexible conduit 20 thereto, while a second conduit 23 is connected at a side of each valve housing 21 and at its other end connected with a check valve housing 24 in which a ball check valve 25 is mounted, which preferably is formed integral with the base of the cylinder 8 of each hoist unit (see Fig. 5).

Within the valve housing 21, which has an inlet and two outlets as shown, a rotatable valve 26 is mounted to which an operating arm 27 is connected. Rods 28, joined with the outer ends of the two arms 27 for the two valves used with the two telescopic hoists, extend forward from the arms 27 and are connected with the outer ends of arms 29 mounted upon a shaft 30 mounted for rocking movements on suitable brackets carried by the chassis frame members 1. An arm 31 is also connected to the shaft 30 and, through a link 32 is connected with a manually operable lever 33 pivotally mounted upon one side of the pump 18. By operating the lever 33, the valves 26 in the two housings 21 may be simultaneously operated to close passage either to the pipes 22 or the conduits 23.

Figure 1:
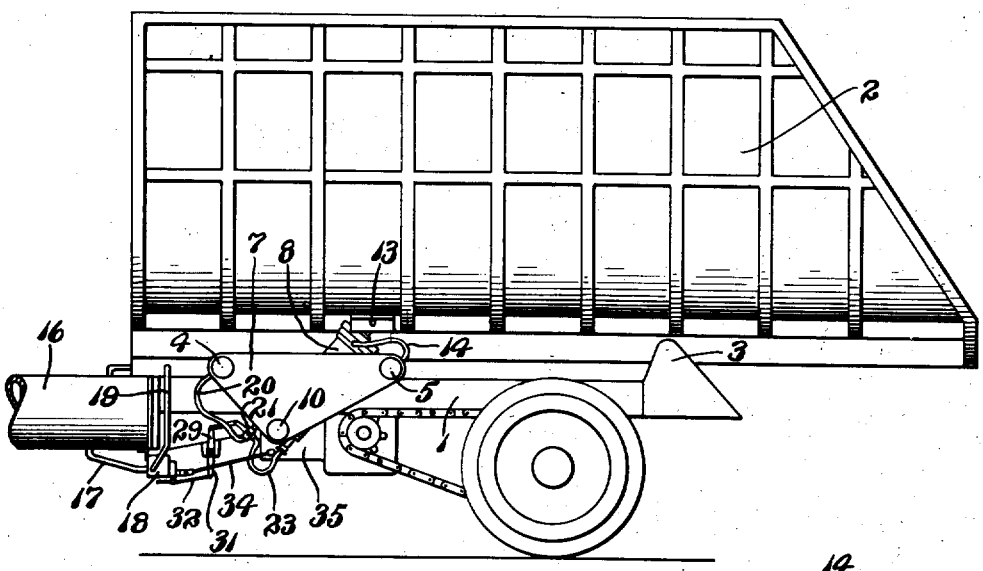
Fig. 1 is an elevation of the rear end portion of a truck showing a body tiltably mounted thereon and equipped with the hoisting mechanism of my invention, the body being in horizontal position.
Figure 2:
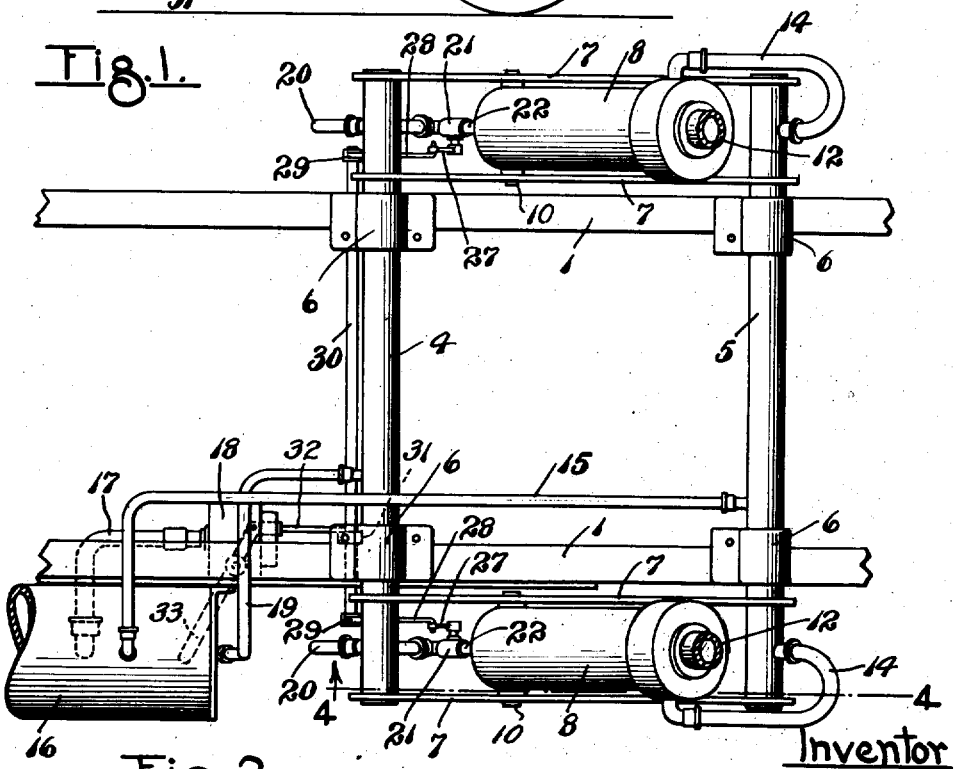
Fig. 2 is a fragmentary plan view of the hoisting mechanism as it is mounted on the chassis side frame members.

The pump 18 is driven by a shaft 34 which has a suitable operative connection with the transmission mechanism of the truck housed within a transmission housing 35 as shown in Fig. 1. The power take-off from the transmission mechanism to the shaft 34, and the manual control for connecting the transmission mechanism with the pump drive shaft 34 is not shown, as it is common and well known in hydraulic hoist dumping mechanism wherein the engine of a truck drives the transmission mechanism and a suitable selective manually operated power take-off mechanism is provided for selectively connecting the gear pump drive with the truck transmission.

To tilt the body and dump its contents valves 26 should be in the position shown in Fig. 5. Upon connecting the drive shaft 34 for the pump with the transmission which in turn is driven by the engine of the truck, oil is pumped through the pipe 19 to the tube 4 and through the two flexible tubes 20, passing through the valve housings 21 and the tubes 23 to the telescoping hoists which are extended to lift and tilt the body. Such extension of the hoist continues until the predetermined limit of extension is reached, whereupon continued pumping of oil through the hoists results in the overflow or excess of oil pumped passing through the flexible tubes 14 to the tube 5 and thence back through the pipe 15 to the reservoir 16. If the engine is stopped or the gear pump 18 disconnected from the transmission the oil in the hoist cannot pass backward through the tubes 22 because stopped by valve 26. Nor can it return through the conduits 23 as the ball valves 25 drop and seat so as to block any passage backward. Thus the body will be held in any position to which it is elevated so long as the valves 26 are as shown in Fig. 5.

To lower the body after it has been once elevated the lever 33 is moved so as to turn arms 27 thus opening passages between the tubes 22 and the flexible conduits 20. The oil returns through the conduits 20, tubes 4 and the pipes 19, through the pump and thence through the pipe 17 to the reservoir 16, the pump being of the type or character which permits a return of oil reversely through the pump.

With this construction a particularly heavy duty hoist structure is provided and one which, because of the novel manner of mounting the same, serves to resist tendency to sidewise twist or strain of the body. The simultaneous extension of the hoists is attained through the novel structure described with the use of one oil pump whereby the pressures of oil acting on the hoists are the same in both hoists. This construction has been used in practice and has proven particularly satisfactory for trucks having bodies which carry very heavy loads many times reaching or exceeding thirty tons in amount.

The invention is defined in the appended claims and is to be considered comprehensive of all forms of structure coming within their scope.

I claim:

1. In combination, a truck having a truck frame, a body tiltably mounted thereon, a hoist supporting structure including spaced apart transverse members located on and above the truck frame and extending at their ends beyond the sides thereof, a pair of spaced apart vertical plates carried by and between said transverse members at each end thereof outside the truck frame, an extensible hydraulic hoist pivotally mounted on and located between the plates of each pair of plates, connections between the upper ends of the hoists and the body and means for simultaneously extending and retracting the hoists.

2. In a construction of the class described, a vehicle chassis frame, two spaced apart tubular supports having closed ends mounted transversely on and above the frame, hoist supporting means extending between said supports, extensible and retractible hydraulic hoists carried by said hoist supporting means, a liquid receptacle, means for pumping liquid therefrom into said hoists to extend the hoists to predetermined positions, means connecting the upper ends of the hoist to the body, liquid overflow tubular connections from said hoists to one of the tubular supports, and a pipe connecting said tubular support with the liquid receptacle.

3. In combination, a vehicle chassis frame, two spaced apart horizontal tubular supports carried on and across the chassis frame, said tubular supports having closed ends, a plurality of hoist supporting means carried on and between said tubular supports, a hydraulic cylindrical extensible hoist carried by each of said plurality of hoist supporting means, means connecting the upper ends of the hoists to the lower side of the body, a liquid holding receptacle, a pump, connections for supplying the same with liquid from said receptacle, connections from said pump to one of said tubular supports for pumping liquid into and through the tubular support, and a tubular connection from said tubular support to the lower end of each hoist for carrying liquid pumped simultaneously to the lower ends of the hoists to extend the same and lift the body.

4. A construction containing the elements in combination defined in claim 3, each of said hoists having an overflow connection in the form of a tubular conduit extending between each hoist and the other of said tubular supports, whereby liquid pumped, after the hoists have been extended a predetermined distance, passes through said tubular connections to said tubular support, and a pipe connecting said second tubular support with the liquid receptacle.

5. In combination, a truck frame, a body tiltably mounted thereon, spaced apart transverse supports carried on and across the track frame, one of said transverse supports being hollow, two pairs of vertical plates carried by said supports, an extensible hydraulic hoist mounted on and between the plates of each pair of plates, connections between the upper end of the hoist and the body and means for supplying the hydraulic hoist with pressure fluid which flows through the hollow transverse support.

6. In combination, a vehicle chassis frame, having side members, a body tiltably mounted thereon, two spaced apart horizontal transverse supports carried on and above said side members and extending beyond the said side members, two pairs of plates or the like spaced from each other carried by the cantilever portions of said horizontal supports and extending between said horizontal supports and having intermediate lower portions extending a distance below said supports and below the lower side of the truck frame, an extensible cylindrical hydraulic hoist having depending ears, a pivot pin extending through said ears and the lower portions of the plates whereby the hoist is pivotally mounted at its lower end on and between said lower portions of the plates of each pair of plates, said cylindrical hoist being substantially medially located between the respective plates, means connecting the upper ends of the hoists with the lower side of the body and means for supplying pressure fluid for the hoists.

7. In combination, a truck having a truck frame, a body tiltably mounted thereon, a hoist supporting structure including members extending outwardly beyond the sides of the truck frame, a pair of spaced apart supporting members mounted between and connected to said members forming a box frame extension at each side of the truck frame extensible hydraulic hoists, means pivotally mounting said hoists in said box frame extensions, said box frame extensions being interconnected across said truck frame, connections between the upper ends of the hoists and the body, and means for simultaneously extending and retracting the hoists.

8. In combination a truck having a truck frame, a body tiltably mounted thereon, a hoist supporting structure including box frame structures extending outwardly beyond the sides of said frame, said structure being interconnected across said frame forming a unit resting on the top thereof, means for securing said unit to said frame, extensible hydraulic hoists, means pivotally mounting said hoists in said box structures, connections between the upper ends of the hoists and the body, and means for simultaneously extending and retracting the hoists.

9. In combination, a truck having a truck frame, a body tiltably mounted thereon, a hoist supporting structure having supporting portions projecting outwardly beyond the sides of the frame at each side of the frame and having an interconnecting portion disposed parallel to the sides of the frame and spaced outwardly therefrom, said interconnecting portion at each side of the frame forming the support for the outer trunnion of a cylindrical hydraulic hoist means, means at each side of the frame spaced inwardly from said interconnecting portion forming the bearing for the inner trunnion of said hoist means, an extensible hydraulic hoist means pivotally mounted to and located between said interconnecting portion and said last named means beyond each side of the frame, connections between the upper ends of the hoists and the body, means for simultaneously extending and retracting the hoists, said supporting projecting portions being interconnected across said frame to form a unit construction.

10. In combination, a truck having a truck frame, a body tiltably mounted thereon, a unitary hoist supporting structure including box frame structures extending outwardly beyond the sides of said frame, said structures being interconnected across said frame, extensible hydraulic hoists, means pivotally mounting said hoists in said box structures, means directly connecting the upper ends of the hoists and the body whereby the weight of the body is supported directly on the hoists, and means for simultaneously extending and retracting the hoists.

LOUIS S. WOOD.